United States Patent
Johnson et al.

(10) Patent No.: US 10,373,113 B2
(45) Date of Patent: Aug. 6, 2019

(54) TRANSPORT VECTOR MANAGEMENT

(71) Applicant: International Fulfillment Solutions, LLC, Salt Lake City, UT (US)

(72) Inventors: Devin C. Johnson, Murray, UT (US); Ben Whitesides, Kaysville, UT (US)

(73) Assignee: International Fulfillment Solutions, LLC, Salt Lake City, UT (US)

( * ) Notice: Subject to any disclaimer, the term of this patent is extended or adjusted under 35 U.S.C. 154(b) by 173 days.

(21) Appl. No.: 15/434,728

(22) Filed: Feb. 16, 2017

(65) Prior Publication Data
US 2018/0232687 A1    Aug. 16, 2018

(51) Int. Cl.
*G06Q 10/08*    (2012.01)

(52) U.S. Cl.
CPC ......... *G06Q 10/087* (2013.01); *G06Q 10/083* (2013.01)

(58) Field of Classification Search
USPC ........................................... 235/385
See application file for complete search history.

(56) References Cited

U.S. PATENT DOCUMENTS

| 2014/0279648 A1* | 9/2014 | Whitehouse | G06Q 10/083 705/330 |
| 2017/0124511 A1* | 5/2017 | Mueller | G06Q 10/0837 |
| 2018/0012151 A1* | 1/2018 | Wang | G06Q 10/0639 |

* cited by examiner

*Primary Examiner* — Michael G Lee
*Assistant Examiner* — David Tardif
(74) *Attorney, Agent, or Firm* — Workman Nydegger

(57) ABSTRACT

A computer system for dynamically managing the transport vector of items receives a client identification and handling parameters from an input device. The system identifies, within a client database, different transport vectors associated with the client identification. The system then accesses one or more item-specific variables associated with the particular item. The system also filters the different transport vectors by the item-specific variables and the handling parameters such that a remaining subset of the different transport vectors all conform with the item-specific variables and the handling parameters. The system selects a specific transport vector from the remaining subset of the different transport vectors based upon a ranking of a user specified attribute. The system then generates a physical digital encoding that conforms with a particular template associated with the specific transport vector.

20 Claims, 3 Drawing Sheets

TRANSPORT VECTOR MANAGEMENT

BACKGROUND

Computers and computing systems have affected nearly every aspect of modern living. Computers are generally involved in work, recreation, healthcare, transportation, entertainment, household management, etc. Computers also provide significant benefits in inventory management and shipment. For example, computer systems are able to leverage large databases of inventory information in conjunction with real-time data relating to shipping conditions, product attributes, and other shipping aspects. This unique technological combination provides significant benefits when determining how best to ship items.

Conventional shipping management applications and inventory management applications are able to prepare items for shipment and track those items once they have shipped. In conventional systems, however, these shipping routes typically deal with a single transport vector. For example, a single shipper or a small subsection of shippers may be available within a given system. The limited numbers and complexity of transport vectors allows for simple applications and systems for managing inventory and shipping.

The explosion of online retail, however, has created a need for far more complex and efficient shipping systems. For example, a company may originate shipments from all around the world and may use a large number of providers for different parts of the shipping journey. Identifying optimizations within these systems and exploiting those optimizations requires tools that are not currently available on the market.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes systems, methods, and apparatus that are configured to perform various acts. For example, disclosed embodiments receive a client identification and handling parameters from an input device. The handling parameters describe various attributes associated with the shipment of a particular item. Disclosed embodiments also identify, within a client database, system attributes associated with the client identification. The system attributes comprise indications of different transport vectors associated with the client identification.

Additionally, disclosed embodiments access one or more item-specific variables associated with the particular item. The item-specific variables comprise indications of attributes of the particular item. Disclosed embodiments filter the different transport vectors by the item-specific variables and the handling parameters such that a remaining subset of the different transport vectors all conform with the item-specific variables and the handling parameters. Further, disclosed embodiments select a specific transport vector from the remaining subset of the different transport vectors based upon a ranking of a user specified attribute. Further still, disclosed embodiments generate a physical digital encoding that conforms with a particular template associated with the specific transport vector, wherein the physical digital encoding is configured to be applied to the particular item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Embodiments disclosed herein provide significant technical benefits over conventional systems. For example, disclosed embodiments identify optimal transport vectors within large shipping systems. Further, disclosed embodiments provide novel systems and methods for identifying potential transport vectors and processing through a transport vector tree.

Figure 1:
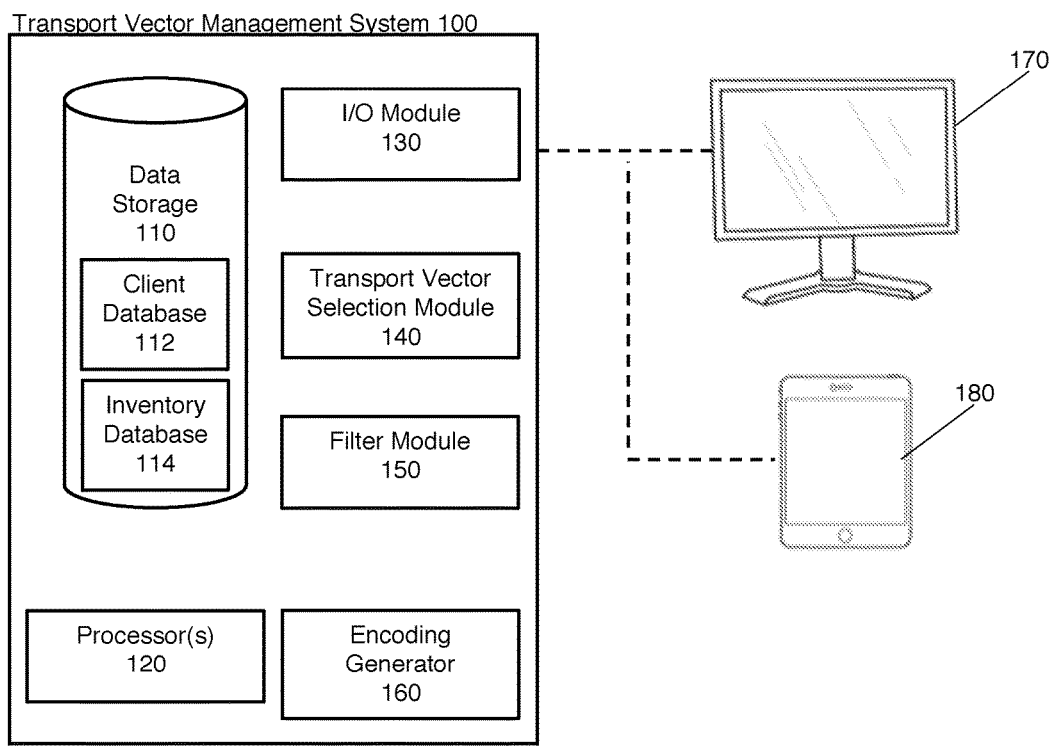
FIG. 1 illustrates a schematic diagram of an embodiment of a system for managing transport vectors.

FIG. 1 illustrates a schematic diagram of an embodiment of a system for managing transport vectors. At least one disclosed embodiment comprises a transport vector management system 100 for dynamically managing the transport vector of items. The transport vector management system 100 comprises various computer-based modules for performing various acts. For example, the transport vector management system 100 comprises data storage 110, processor(s) 120, I/O module 130, a transport vector selection module 140, a filter module 150, and an encoding generator 160. The transport vector management system 100 is in communication with various remote devices, such as computers 170 and mobile devices 180. One of skill in the art will understand that the general depiction of the transport vector management system 100 and the accompanying modules and components is provided only for the sake of example and explanation. In additional or alternative embodiments, the transport vector management system 100 comprises configurations with different modules or combinations of modules.

In at least one embodiment, the I/O module 130 within the transport vector management system 100 receives a client identification and handling parameters from an input device such as a computer 170. For example, the input may be generated by a producer preparing to ship a particular item to a customer. Initially, the producer transmits a client identification to the transport vector management system 100. Typically, the client identification is in the form of a user login. The producer also provides the transport vector management system 100 with the handling parameters which describe various attributes associated with the shipment of the particular item. For instance, the handling parameters may include the destination location of the particular item (e.g., the customer's address) and a time frame in which the particular item should arrive at the destination location.

The processor(s) 120 then identify, within a client database 112 that is stored in the data storage 110, system attributes associated with the client identification. As used herein, the system attributes are variables associated with a client by the transport vector management system 100. For example, the system attributes comprise indications of different transport vectors associated with the client identification. As used herein, transport vectors comprise indications of the different transportation options that are available to a particular client. The transport vectors may be predetermined based upon the client's location or may be dynamically generated as described below.

In at least one embodiment, the transport vector management system 100 also accesses one or more item-specific variables associated with the particular item that is being shipped. The item-specific variables comprise indications of attributes of the particular item, such as special shipping instructions, indications of the item type, or other similar information. In at least one embodiment, when a client initially submits a shipping request, the request also comprises a serial number, or some other indication, of a product type. The processor(s) 120 access the inventory database 114 and look-up the serial number. The one or more item-specific variables are stored within the inventory database 114. In contrast, in at least one embodiment, the transport vector management system 100 receives at least a portion of the one or more item-specific variables from the client during the initial request.

After receiving the various variables and data, the filter module 150 filters the different transport vectors by the item-specific variables and the handling parameters such that a remaining subset of the different transport vectors all conform with the item-specific variables and the handling parameters. For example, the particular item may comprise lithium batteries, which cannot be shipped using an air-based transport vector. As such, the filter module 150 removes all transport vectors that are associated with air travel. Additionally, the filter module 150 removes transport vectors that would take too long to deliver the package. The remaining subset of the transport vectors would all be able to handle the type of item being shipped and deliver the item before the latest allowed data indicated by the handling parameters.

Using the remaining subset of transport vectors, the transport vector selection module 140 selects a specific transport vector from the remaining subset of the different transport vectors based upon a ranking of a user specified attribute. For example, the user may direct the transport vector management system 100 to optimize the transport vectors based upon cost. In such a case, the transport vector selection module 140 optimizes the subset of vectors by selecting a specific transport vector that is the least expensive.

In at least one embodiment, when the transport vector management system 100 originally receives the system attributes associated with the client identification, it also receives one or more locations associated with the client. For example, a particular client may have multiple locations that they ship from. As such, different subsets of the transport vectors associated with the client identification are associated with different locations within the multiple locations. For example, some transport vectors may be available from a first location while other transport vectors may be available from a second location.

In at least one embodiment, the handling parameters comprise an indication of a particular location selected from the multiple locations that is associated with the particular item. As such, the filter module 150 and the transport vector selection module 140 act upon the transport vectors that are associated with the location of the particular item. In any case, a particular transport vector is identified that is capable of shipping the particular item from the original location of the item to the destination.

Once the desired transport vector is identified, the encoding generator 160 then generates a physical digital encoding that conforms with a particular template associated with the specific transport vector. The physical digital encoding is configured to be applied to the particular item. For example, the encoding generator 160 may generate a shipping label or near field communication chip (NFC) that conforms with a carrier template that is associated with the specific transport vector. The particular items are then able to be seamlessly added to the transport vector using the properly formatted physical digital encoding that is compliant with the associated shipper's system.

In at least one embodiment, the encoding generator 160 generates the physical digital encoding by accessing a visual indicator from a transport vectors dataset. The transport vector dataset is stored within the data store 110. The transport vectors dataset comprises a set of different visual indicators associated with each transport vector such that each transport vector is associated with a unique visual indicator. For example, the unique visual indicator may comprise a particular color, a particular number, or a particular symbol. The visual indicator is printed on the physical digital encoding such that workers are quickly able to identify which transport vector is associated with the particular item. Workers are then able to easily and without mistake sort multiple shipping items that are going to different transport vectors such that they ship using the correct transport vector.

Accordingly, disclosed embodiments comprise systems and methods for managing multiple transport vectors. One of skill in the art will appreciate the difficulty associated with optimizing transport vectors within a large complex shipping system. For example, many shipping systems may utilize multiple carriers that each have different rates depending upon the weight of the items to be shipped, the origination location of the items to be shipped, the destination of the items to be shipped, and many other similar attributes.

While various conventional systems and methods for shipping products and calculating rates exist, these systems all suffer from significant technical problems. For example, these conventional systems fail to provide an efficient data structure for identifying optimized routes. Instead, conventional systems use exhaustive crawling methods that are not intelligent or dynamic enough to meet the needs of modern, high volume shippers.

Figure 2:
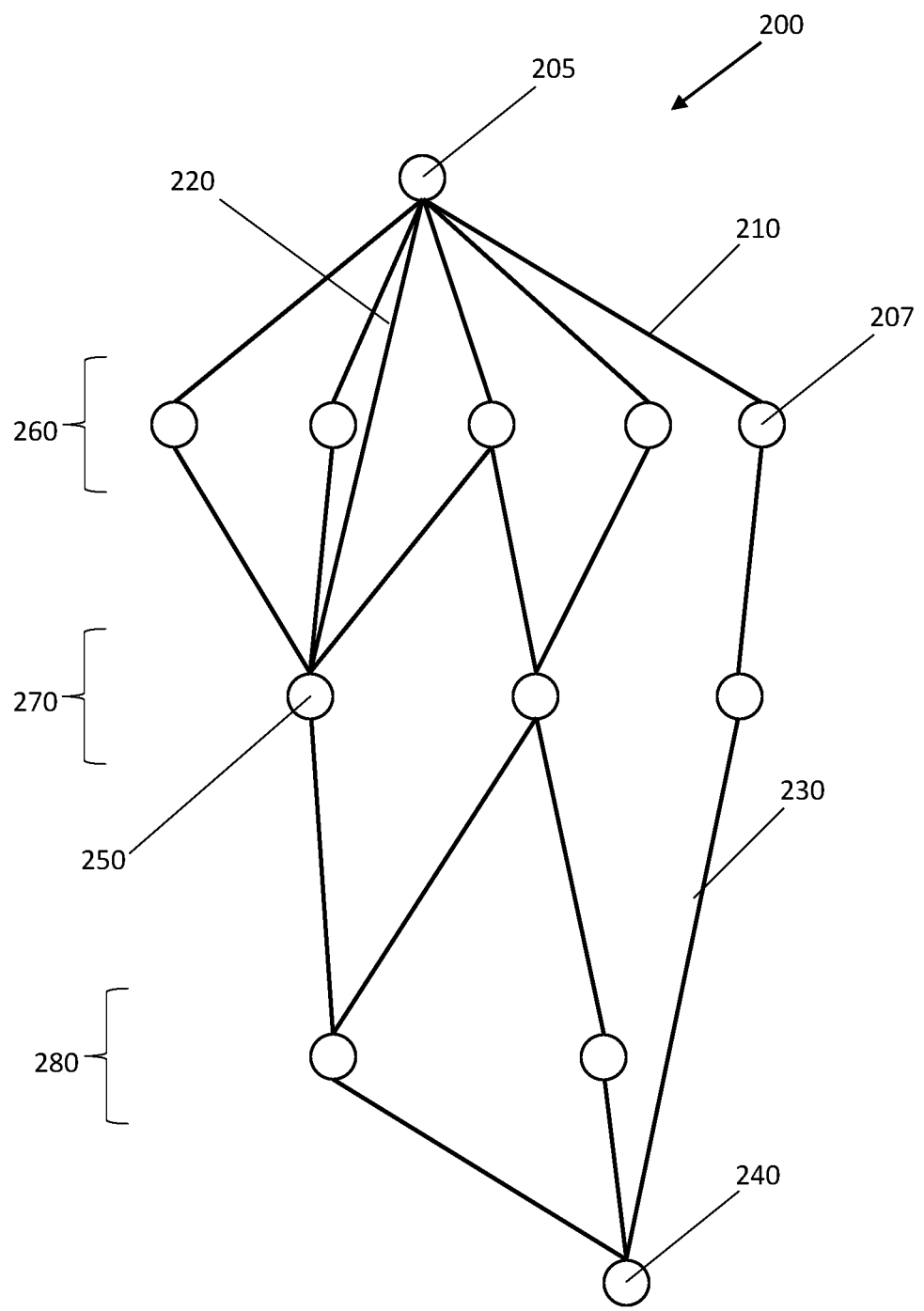
FIG. 2 illustrates a schematic diagram of an embodiment of a transport vector tree 200.

Accordingly, at least one disclosed embodiment comprises a unique data structure and processing structure for optimizing transport vectors. For example, FIG. 2 depicts a schematic diagram of a transport vector tree 200. The depicted transport vector tree 200 comprises various intersection points (e.g., 250) that are each representative of a shipping facility along the pathway from the origination facility 205 to the destination facility 240. The intersection points are divided into a first layer 260, a second layer 270, and a third layer 280. The transport vector tree 200 also comprises edges (e.g., 210) that connect intersection points together. One of skill in the art will appreciate that the visual depiction of the transport vector tree 200 is provided only for the sake of example and explanation. As used within a computing system, the schematic may never be visually depicted, but instead exist within storage or memory as a linked list.

In at least one embodiment, upon initially receiving a request to ship a product, the transport vector selection module 140 begins to build a transport vector tree 200. In particular, the transport vector selection module 140 identifies an origination intersection point 205 that is associated with the origination location of the item to be shipped. In at least one embodiment, an intersection point comprises a data object that stores information about the geographic location with which the intersection point is associated and also stores information about other connected intersection points. An intersection point is considered to be connected if a transport vector exists that can ship an item directly from the first intersection point to the second intersection point while passing through another intersection point.

When building the transport tree 200, the transport vector selection module 140 identifies the time span in which the item to be shipped must arrive at its destination (shown in FIG. 2 as intersection point 240). The transport vector selection module then crawls through a data structure of all available transport vectors and associated intersection points, while at the same time accounting for the required time frame. For example, in at least one embodiment, the transport vector selection module 140 divides the transport vector tree 200 into layers. To optimize the amount of crawling through the data structure, the transport vector selection module 140 limits the transport vector tree size to a number of layers that equals the number of days within the time frame. For example, if the time frame required the package to arrive within 3-4 days, the transport vector selection module 140 limits the number of layers to three, as depicted in FIG. 2.

In at least one embodiment, even with limiting the transport vector tree 200 to three layers, transport vectors may be added to the tree that would require more than the allowed time to deliver the item. As such, after building the initial transport vector tree 200, the transport vector prunes the tree by removing transport vectors that would require too much time.

Once the transport vector selection module 140 has identified the intersection points, the transport vector selection module 140 generates edges between the connected intersection points. In at least one embodiment, each edge represents an independently executable software object. Each software object comprises independent functions and processes that receive inputs from the data associated with each intersection point. Each edge is representative of a trip from one intersection point to the next.

In at least one embodiment, the software object associated with each edge generates a cost associated with the edge and a preference score. For example, edge 210 may be associated with the travel between the client's address (represented by intersection point 205) and a UNITED STATES POST OFFICE sorting center (represented by intersection point 207). The edge 210 identifies the cost associated with the trip by identifying the cost provided by the UNITED STATES POST OFFICE for that trip.

The edge 210 then calculates a preference score. In at least one embodiment, the preference score is based upon the past reliability and projected future reliability of that particular trip. For example, the edge 210 calculates the average shipping time between intersection point 205 and the intersection point 207. This average is calculated using a dataset of numbers that the edge 210 has generated over time through tracking shipments between the two intersection points 205, 207. The edge 210 is also able to calculate a future reliability score based upon variables such as weather reports. For instance, the edge 210 may identify that a major storm is supposed to develop at intersection point 207 in the next couple of days. Based upon this information, the edge 210 gives itself a low preference score.

In at least some embodiments, an edge can skip a layer 260, 270, 280 within the transport vector tree 200. For example, edge 220 traverses from intersection point 205 to intersection point 250 in the second layer 270. In the depicted example, edge 220 is representative of a direct haul line between intersection point 205 and a shipping facility that is represented by intersection point 250. Edge 250 represents a major shipping center, as indicated by multiple edges converging at that intersection point.

In some cases, a process known as zone skipping can provide significantly lower shipping rates and times. Zone skipping occurs when an item to be shipped is not delivered to the nearest location associated with a particular carrier. Instead, a direct haul line (often times a contracted trucking company) hauls the item to another pickup location associated with the particular carrier. In some cases, the other pickup location can be several states away. This particular process of zone skipping is represented by edge 220. Edge 220 comprises an executable object that calculates the cost associated with shipping the item using a contracted trucking company. The executable object also calculates a preference score for that particular edge.

In at least one embodiment, however, an edge may bypass a layer within the transport vector tree 200 simply because it is a more direct route. For example, edge 230 bypasses the third layer 280 in the tree. In this case, edge 230 provides a shipping route that does not require any additional stops before arriving at the destination intersection point 240.

As depicted in FIG. 2, a transport vector is represented by a continuous line of edges and intersection points between intersection point 205 and intersection point 240. Each transport vector comprises a linked list of software objects in the form of edges and data objects in the form of intersection points. One will appreciate the technical problems that are solved within such a set up. For example, within conventional systems when shipping from any origination location to any destination location it is incredibly memory and processor intensive to maintain data structures that statically describe every transport vector from every possible origination point to every possible destination point. Additionally, it is computationally intensive to gather up-to-date information associated with each of these vectors.

In contrast to the technical challenges present in conventional systems, the disclosed transport vector tree 200 dynamically gathers data related to transport vectors. Additionally, representing each edge as an independent software object provides a system that is highly threadable, which allows modern, multi-core computer processors to be leveraged. For each transport vector, the executable objects in the edges can quickly combine their costs and preference scores to generate values that significantly improve the selection of a transport vector. For example, a more expensive transport vector may be desirable because a cheaper transport vector has a lower preference score due to an expected storm that could significantly delay shipments.

One will appreciate that embodiments disclosed herein can also be described in terms of flowcharts comprising one or more acts for accomplishing a particular result. For example, FIG. 3 and the corresponding text describe acts in various systems for performing methods and/or stand-alone methods for dynamically managing the transport vector of items. The acts of FIG. 3 are described below.

Figure 3:
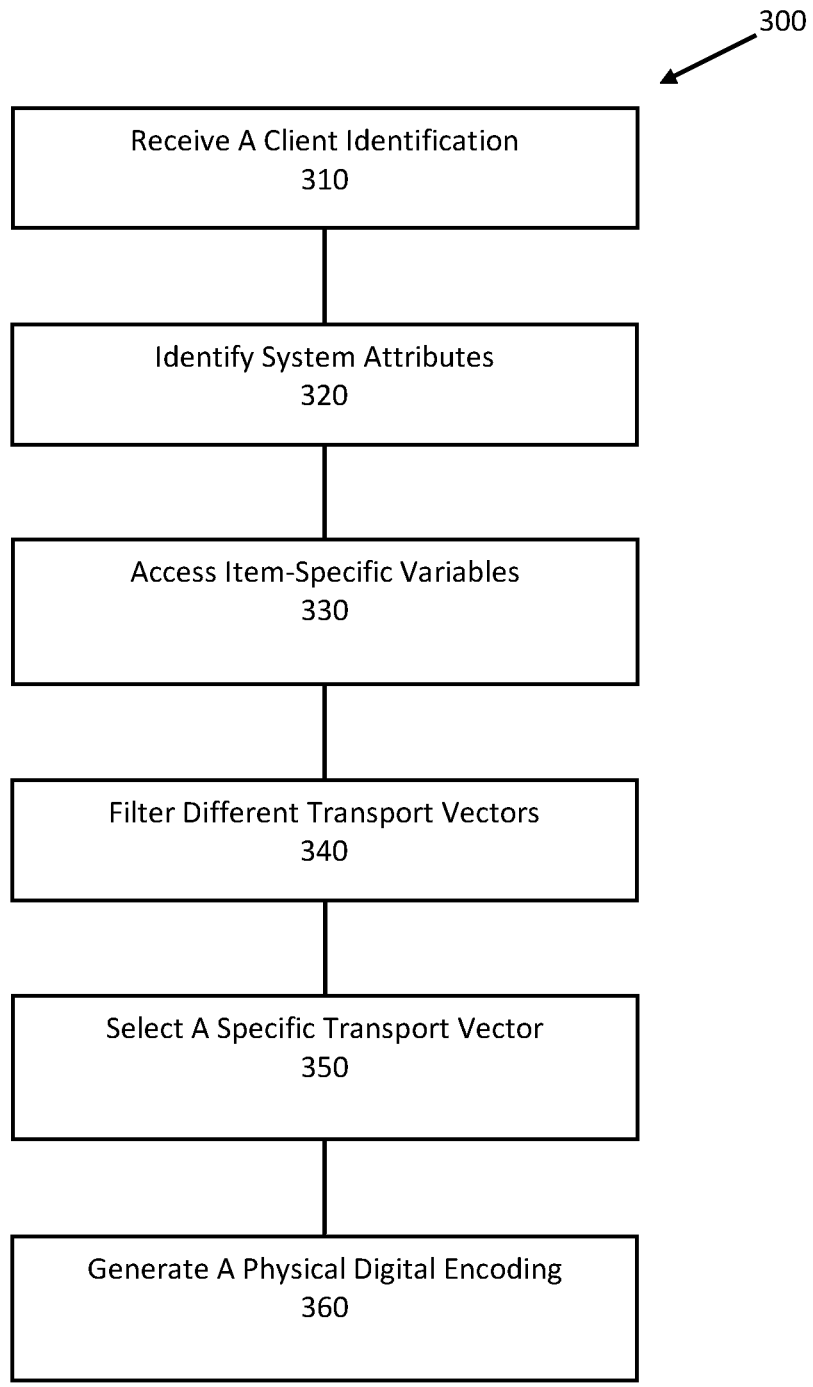
FIG. 3 illustrates a flowchart for an embodiment of a method for managing transport vectors.

For example, FIG. 3 illustrates a flowchart 300 of acts associated with methods for dynamically managing the transport vector of items. The illustrated acts comprise an act 310 of receiving a client identification. Act 310 includes receiving a client identification and handling parameters from an input device, wherein the handling parameters describe various attributes associated with the shipment of a particular item. For example, the transport vector management system 100 receives a user identification in the form of a user login to the system. The transport vector management system 100 also receives handling parameters, such as a shipping time frame.

The next illustrated act 320 comprises identifying system attributes. Act 320 includes identifying, within a client database, system attributes associated with the client identification, wherein the system attributes comprise indications of different transport vectors associated with the client identification. For example, the transport vector management system 100 may identify within a client database 112 that a client is associated with multiple locations. Each location may also be associated with specific transport vectors.

Illustrated act 330 comprises accessing item-specific variables. Act 330 includes accessing one or more item-specific variables associated with the particular item, wherein the item-specific variables comprise indications of attributes of the particular item. For example, the processor(s) 120 look-up a product in an inventory database 114. The inventory database 114 comprises variables about each type of product. For example, a particular type of product may be flagged as only being shippable using ground transport.

Additionally, illustrated act 340 comprises filtering different transport vectors. Act 340 includes filtering the different transport vectors by the item-specific variables and the handling parameters such that a remaining subset of the different transport vectors all conform with the item-specific variables and the handling parameters. For example, the filter module 150 creates a remaining subset of transport vectors by filtering out transport vectors that will take too long or that violate item-specific variables (e.g., air transport).

Further, illustrated act 350 comprises selecting a specific transport vector. Act 350 includes selecting a specific transport vector from the remaining subset of the different transport vectors based upon a ranking of a user specified attribute. For example, the transport vector selection module 140 selects an optimized transport vector based upon a user specified attribute, such as cost. In alternative embodiments, the user specified attribute may comprise any rankable attribute. For example, the user may desire the fastest delivery possible, in which case, the transport vector selection module 140 would pick the quickest transport vector from the remaining subset of transport vectors.

Further still, illustrated act 360 comprises generating a physical digital encoding. Act 360 includes generating a physical digital encoding that conforms with a particular template associated with the specific transport vector, wherein the physical digital encoding is configured to be applied to the particular item. For example, the encoding generator 160 can create a shipping label that conforms with the particular template of a specific transport vector. For instance, the transport vector may be associated with the UNITED STATES POST OFFICE. As such, the encoding generator 160 can create a label with a digital encoding that can be read by the UNITED STATES POST OFFICE's computer system and easily inserted into their shipping stream.

Accordingly, embodiments disclosed herein provide solutions to several technical problems relating to the management of transport vectors within a shipping system. For example, disclosed embodiments include a novel transport vector tree that is capable of identifying and processing multiple potential transport vectors. The transport vector tree also provides means for dynamically updating transport vectors using a highly threadable processing scheme.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for dynamically managing one or more transport vectors of items, comprising:
   one or more processors; and
   one or more computer-readable media having stored thereon executable instructions that when executed by the one or more processors configure the computer system to perform at least the following:
      receive a client identification and handling parameters from an input device, wherein the handling parameters describe various attributes associated with shipment of a particular item;
      identify, within a client database, system attributes associated with the client identification, wherein the system attributes comprise indications of different transport vectors associated with the client identification, wherein each one of at least some of the different transport vectors is processed through a transport vector tree that includes tree layers corresponding to different intersection points of the processed transport vectors, and wherein a number of the tree layers in the transport vector tree is limited based on at least one of the handling parameters;
      access one or more item-specific variables associated with the particular item, wherein the item-specific variables comprise indications of attributes of the particular item;

filter the different transport vectors by the item-specific variables and the handling parameters such that a remaining subset of the different transport vectors all conform with the item-specific variables and the handling parameters;

select a specific transport vector from the remaining subset of the different transport vectors based upon a ranking of a user specified attribute; and generate a physical digital encoding that conforms with a particular template associated with the specific transport vector, wherein the physical digital encoding is configured to be applied to the particular item.

2. The computer system of claim 1, wherein the handling parameters comprise a destination location.

3. The computer system of claim 2, wherein the handling parameters comprise a time frame in which the particular item should arrive at the destination location, and wherein the at least one handling parameter used to limit the number of tree layers in the transport vector tree is the time frame such that the number of tree layers in the transport vector tree is equal to or less than a number of days within the time frame.

4. The computer system of claim 1, wherein the system attributes comprise an indication of a location associated with the client identification.

5. The computer system of claim 4, wherein the transport vectors associated with the client identification are determined based upon the location associated with the client identification.

6. The computer system of claim 1, wherein:
the system attributes comprise indications of multiple locations associated with the client identification, and the handling parameters comprise an indication of a particular location selected from the multiple locations that are associated with the particular item.

7. The computer system of claim 6, wherein different subsets of the transport vectors associated with the client identification are associated with different locations within the multiple locations.

8. The computer system of claim 7, wherein filtering the different transport vectors comprises filtering a particular subset of the transport vectors, wherein the particular subset of the transport vectors is selected based upon the particular location selected from the multiple locations that are associated with the particular item.

9. The computer system of claim 1, wherein the one or more item-specific variables comprise indications that the particular item is only eligible for ground-based transport vectors.

10. The computer system of claim 1, wherein the physical digital encoding comprises a shipping label.

11. The computer system of claim 10, wherein generating the physical digital encoding further comprises:
accessing a visual indicator from a transport vectors dataset, wherein the transport vectors dataset comprises a set of different visual indicators associated with each transport vector such that each transport vector is associated with a unique visual indicator.

12. The computer system of claim 1, wherein the physical digital encoding comprises a near field communication chip (NFC).

13. A method for dynamically managing one or more transport vectors of items, comprising:
receiving a client identification and handling parameters from an input device, wherein the handling parameters describe various attributes associated with shipment of a particular item;

identifying, within a client database, system attributes associated with the client identification, wherein the system attributes comprise indications of different transport vectors associated with the client identification, wherein each one of at least some of the different transport vectors is processed through a transport vector tree that includes tree layers corresponding to different intersection points of the processed transport vectors, and wherein a number of the tree layers in the transport vector tree is limited based on at least one of the handling parameters;

accessing one or more item-specific variables associated with the particular item, wherein the item-specific variables comprise indications of attributes of the particular item;

filtering the different transport vectors by the item-specific variables and the handling parameters such that a remaining subset of the different transport vectors all conform with the item-specific variables and the handling parameters;

selecting a specific transport vector from the remaining subset of the different transport vectors based upon a ranking of a user specified attribute; and generating a physical digital encoding that conforms with a particular template associated with the specific transport vector, wherein the physical digital encoding is configured to be applied to the particular item.

14. The method of claim 13, wherein:
the system attributes comprise indications of multiple locations associated with the client identification, and the handling parameters comprise an indication of a particular location selected from the multiple locations that is associated with the particular item.

15. The method of claim 14, wherein different subsets of the transport vectors associated with the client identification are associated with different locations within the multiple locations.

16. The computer system of claim 15, wherein filtering the different transport vectors comprises filtering a particular subset of the transport vectors, wherein the particular subset of the transport vectors is selected based upon the particular location selected from the multiple locations that are associated with the particular item.

17. The method of claim 16, wherein the physical digital encoding comprises a shipping label.

18. The method of claim 17, wherein generating the physical digital encoding further comprises:
accessing a visual indicator from a transport vectors dataset, wherein the transport vectors dataset comprises a set of different visual indicators associated with each transport vector such that each transport vector is associated with a unique visual indicator.

19. The computer system of claim 13, wherein the handling parameters comprise a destination geo-spatial location.

20. A non-transitory computer readable medium including software for causing a processor to:
receive a client identification and handling parameters from an input device, wherein the handling parameters describe various attributes associated with shipment of a particular item;

identify, within a client database, system attributes associated with the client identification, wherein the system attributes comprise indications of different transport vectors associated with the client identification, wherein each one of at least some of the different transport vectors is processed through a transport vector tree that includes tree layers corresponding to different intersection points of the processed transport vectors, and wherein a number of the tree layers in the transport vector tree is limited based on at least one of the handling parameters;

access one or more item-specific variables associated with the particular item, wherein the item-specific variables comprise indications of attributes of the particular item;

filter the different transport vectors by the item-specific variables and the handling parameters such that a remaining subset of the different transport vectors all conform with the item-specific variables and the handling parameters;

select a specific transport vector from the remaining subset of the different transport vectors based upon a ranking of a user specified attribute; and generate a physical digital encoding that conforms with a particular template associated with the specific transport vector, wherein the physical digital encoding is configured to be applied to the particular item.

* * * * *